United States Patent
Bonanno

(10) Patent No.: US 8,127,796 B2
(45) Date of Patent: Mar. 6, 2012

(54) EXHAUST GAS RECIRCULATION VALVE FOR A MOTOR VEHICLE

(75) Inventor: Rosario Bonanno, Bad Soden (DE)

(73) Assignee: Continental Automotive GmbH, Hannover (DE)

( * ) Notice: Subject to any disclaimer, the term of this patent is extended or adjusted under 35 U.S.C. 154(b) by 75 days.

(21) Appl. No.: 12/810,334

(22) PCT Filed: Dec. 15, 2008

(86) PCT No.: PCT/EP2008/067571
§ 371 (c)(1),
(2), (4) Date: Jun. 24, 2010

(87) PCT Pub. No.: WO2009/087019
PCT Pub. Date: Jul. 16, 2009

(65) Prior Publication Data
US 2010/0288955 A1    Nov. 18, 2010

(30) Foreign Application Priority Data
Jan. 4, 2008   (DE) .......................... 10 2008 003 177

(51) Int. Cl.
*F16K 1/00*   (2006.01)
(52) U.S. Cl. .................. 137/876; 137/625.47
(58) Field of Classification Search .............. 137/876, 137/874, 872, 625.47, 887; 251/208, 209; 123/568.11, 568.18, 568.23, 568.24
See application file for complete search history.

(56) References Cited

U.S. PATENT DOCUMENTS

| 5,273,073 | A | 12/1993 | Romanchik et al. |
| 5,690,070 | A | 11/1997 | Wendel et al. |
| 6,062,205 | A * | 5/2000 | Bevan et al. ............. 123/568.24 |
| 7,617,678 | B2 * | 11/2009 | Joergl et al. ................. 60/605.2 |
| 7,886,769 | B2 * | 2/2011 | Muller .......................... 137/874 |
| 2003/0164464 | A1 | 9/2003 | Haushaelter et al. |

FOREIGN PATENT DOCUMENTS

| DE | 44 31 711 A1 | 3/1996 |
| DE | 196 31 337 A1 | 2/1998 |
| DE | 199 27 673 A1 | 12/2000 |
| EP | 1 335 158 A2 | 8/2003 |
| EP | 1 335 158 B1 | 8/2003 |
| EP | 1 435 451 A2 | 7/2004 |
| FR | 2 727 158 A1 | 5/1996 |
| FR | 2 795 152 A1 | 12/2000 |
| JP | 2007-321708 A | 12/2007 |

* cited by examiner

*Primary Examiner* — John Fox
*Assistant Examiner* — Seth Faulb
(74) *Attorney, Agent, or Firm* — Cozen O'Connor

(57) ABSTRACT

The exhaust gas recirculation valve comprises a tubular valve housing includes a gas inlet, a first gas outlet and a second gas outlet located proximate thereto. Located inside the tubular valve housing is a rotatably supported valve body that is designed as a hollow body having a semi-cylindrical lateral surface having a lateral penetration opening. The gas inlet as seen from the top includes a blocking wall on the side thereof facing the first gas outlet and the second gas outlet, the blocking wall being located inside the valve housing perpendicular thereto and having a height equal to at least the length of the valve body and sitting flush against the gas passage in the closed position of the exhaust gas recirculation valve.

9 Claims, 5 Drawing Sheets

குடியரசுத்

# EXHAUST GAS RECIRCULATION VALVE FOR A MOTOR VEHICLE

PRIORITY CLAIM

This is a U.S. national stage of Application No. PCT/EP2008/067571, filed on Dec. 15, 2008, which claims priority to German Application No: 10 2008 003 177.1, filed: Jan. 4, 2008 the contents of which are incorporated herein by reference.

BACKGROUND OF THE INVENTION

1. Field of the Invention

The invention relates to an exhaust gas recirculation valve for a motor vehicle.

2. Related Art

Valves are known. A flap valve for fuel units is described in EP 1 335 158 B1. This flap valve has a gas inlet and two gas outlets. Each gas outlet can be closed with a valve flap, both valve flaps being arranged perpendicular to one another. This makes it possible to direct the entire quantity of gas either through one gas outlet or the other gas outlet. In general, two gas outlets are provided in order either to cool the gas downstream of the respective gas outlet or to pass it on uncooled. The respective switchover is accomplished by the valve flaps, which are rotatably supported on a common shaft. However, the arrangement of such valve flaps is not universally advantageous. During the production of flap valves, appropriate adjustment of each valve flap is generally problematic. In most cases, there are disadvantageous problems with sealing, which have a negative effect on the operation of the flap valve.

SUMMARY OF THE INVENTION

An object of the invention to provide an exhaust gas recirculation valve for a motor vehicle, in which it is possible to dispense with the provision of disadvantageous valve flaps.

An object underlying the invention is achieved by an exhaust gas recirculation valve for a motor vehicle, which comprises a tubular valve housing, which has a gas inlet E, a first gas outlet A1 and a second gas outlet A2 arranged proximate thereto, each of which branches off from the lateral outer surface of the tubular valve housing, in which there is arranged within the tubular valve housing a rotatably supported valve body, which is designed as a hollow body with a semi-cylindrical lateral surface having a lateral penetration opening, the longitudinal axis of the cylinder which defines the semi-cylindrical lateral surface forming an axis of rotation of the valve body, and a partition wall being arranged between the axis of rotation and the semi-cylindrical lateral surface, directly opposite the lateral penetration opening, and a gas passage being arranged between the axis of rotation and the semi-cylindrical lateral surface, directly opposite the area without a penetration opening, in which, in plan view, the gas inlet E has a blocking wall on the side thereof facing the first gas outlet A1 and the second gas outlet A2, said blocking wall being arranged perpendicularly inside the valve housing and having a height corresponding to at least the length L of the valve body and resting flush against the gas passage in the closed position of the exhaust gas recirculation valve. During the operation of the exhaust gas recirculation valve, the valve body is moved into the desired position through the rotary motion, the aim being to set whether and in what quantity the exhaust gas is passed through the first gas outlet A1 or the second gas outlet A2. In general, the valve housing and the valve body are composed of metallic materials. It has surprisingly been found that the exhaust gas recirculation valve can be operated reliably over lengthy periods of operation even when the provision of valve flaps is completely dispensed with. In the process, sealing problems are advantageously avoided.

A preferred embodiment of the invention is one in which a shaft is arranged perpendicularly as the axis of rotation. In this arrangement, it is particularly advantageous if the shaft is welded or bonded to the valve body, for example, thus forming a unit with the valve body. The provision of a shaft as the axis of rotation is a particularly advantageous way of enabling the positioning of the valve body in the valve body to be adjusted.

According to another preferred embodiment of the invention, pieces of tube, the longitudinal axes of which lie in the same plane, are provided as the gas inlet E, the first gas outlet A1 and the second gas outlet A2. The arrangement of pieces of tube is a relatively unproblematic process, and the arrangement of the longitudinal axes in the same plane or at the same level makes the process of designing the valve body easier.

According to another preferred embodiment of the invention, the penetration opening is of circular design in side view. It is advantageous here that the penetration opening can be provided relatively rapidly and unproblematically in the valve body by a single drilling.

According to another preferred embodiment of the invention, the longitudinal axes of the first gas outlet A1 and of the second gas outlet A2 are at an angle of 90° to one another. This enables particularly advantageous adjustment, e.g. distribution, of the quantities of exhaust gas between the first gas outlet A1 and the second gas outlet A2 with the aid of the valve body.

BRIEF DESCRIPTION OF DRAWINGS

The invention is explained in greater detail below by way of example with reference to the drawings.

DETAILED DESCRIPTION OF THE DRAWINGS

Figure 1:
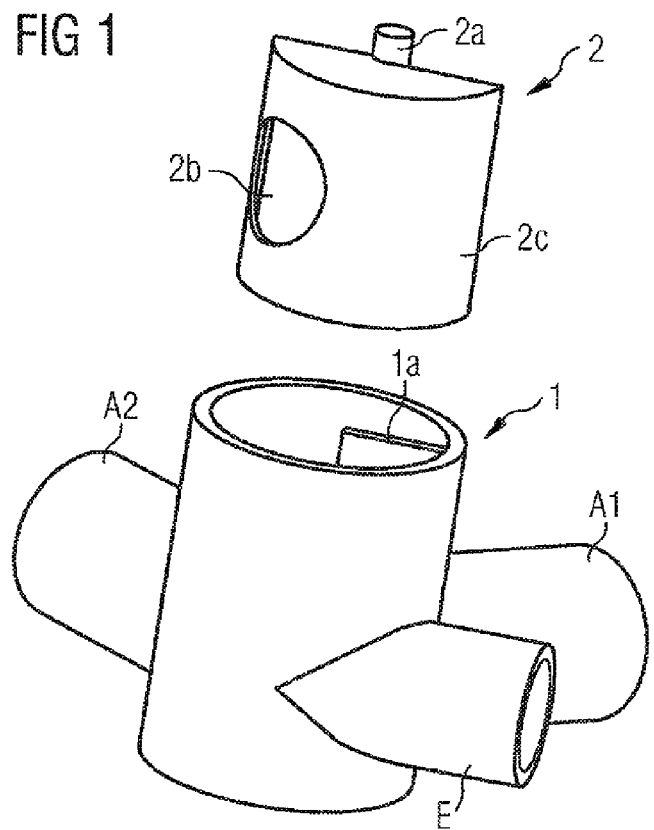
FIG. 1 is a perspective exploded view of an exhaust gas recirculation valve with the valve housing and the valve body.

FIG. 1 is the exhaust gas recirculation valve for a motor vehicle with the valve housing 1 and the valve body 2 in the form of a three-dimensional exploded representation. The exhaust gas recirculation valve for a motor vehicle comprises a tubular valve housing 1, which has a gas inlet E, a first gas outlet A1 and a second gas outlet A2 arranged proximate to each other, each of the outlets branching off from a lateral outer surface of the tubular valve housing 1. Provision is made for the arrangement within the tubular valve housing 1 of a rotatably supported valve body 2, configured as a hollow body having a semi-cylindrical lateral surface 2c which has a lateral penetration opening 2b. The penetration opening 2b is preferably of circular design in side view. The longitudinal axis of the cylinder which defines the semi-cylindrical lateral surface 2c forms an axis of rotation 2a of the valve body 2. In plan view, the gas inlet E has a blocking wall 1a on a side thereof facing the first gas outlet A1 and the second gas outlet A2, said blocking wall being arranged perpendicularly inside the valve housing 1.

Figure 2:
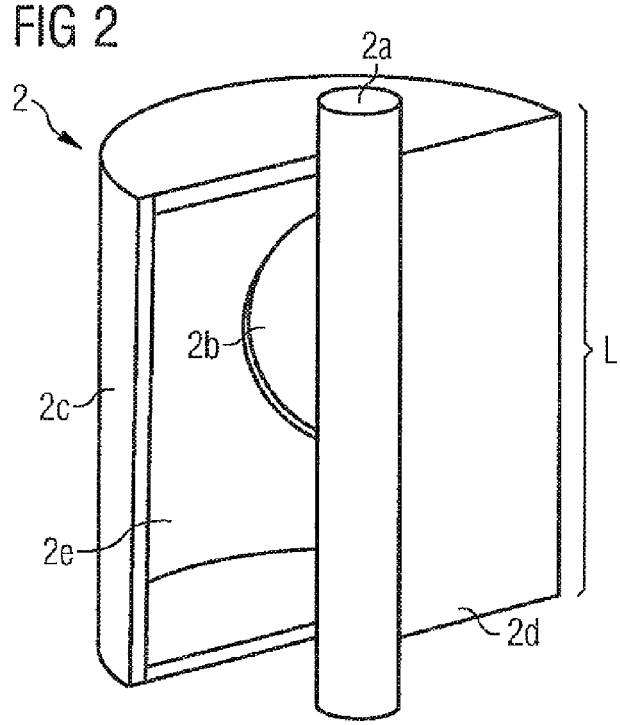
FIG. 2 is a rear perspective view side of the valve body.

FIG. 2 is the rear side of the valve body 2 in three dimensions. Here, a shaft is arranged perpendicularly as the axis of rotation 2a. A partition wall 2d is arranged between the axis of rotation 2a and the semi-cylindrical lateral surface 2c, directly opposite the lateral penetration opening 2b. A gas passage 2e is arranged or provided between the axis of rotation 2a and the semi-cylindrical lateral surface 2c, directly opposite the area without a penetration opening 2e. In this embodiment, the length L of the valve body 2 corresponds to the height of the blocking wall 1a, which is arranged perpendicularly inside the valve housing and rests flush against the gas passage 2e in the closed position of the exhaust gas recirculation valve.

Figure 3:
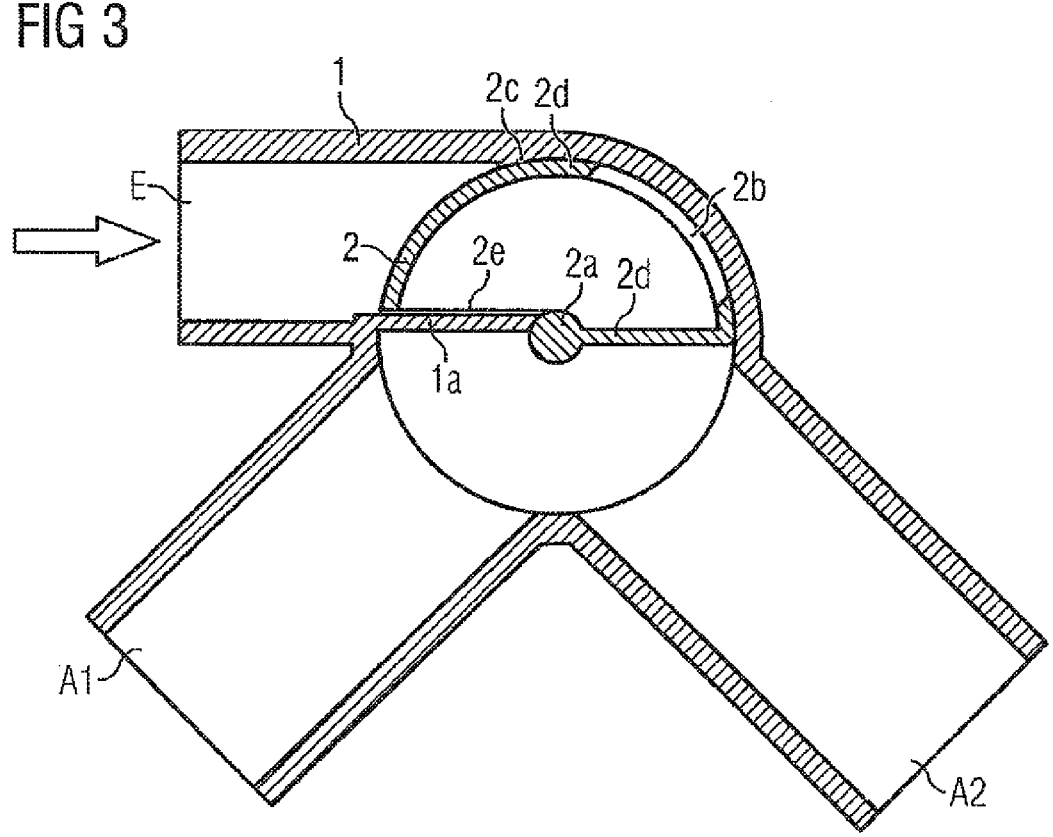
FIG. 3 is a cross section of the exhaust gas recirculation valve in a fully closed position.

FIG. 3 is the exhaust gas recirculation valve for a motor vehicle in cross section in the fully closed position. The exhaust gas entering through the gas inlet E in the direction of the arrow cannot pass either through the first gas outlet A1 or through the second gas outlet A2 arranged proximate thereto. This is achieved, on the one hand, by virtue of the fact that the blocking wall 1a rests flush against the gas passage 2e in this closed position of the exhaust gas recirculation valve. On the other hand, the partition wall 2d likewise prevents gas passing through to the first gas outlet A1 and to the second gas outlet A2. If the valve body 2 is turned in the clockwise direction (FIG. 4), the exhaust gas recirculation valve for a motor vehicle is initially opened or freed for the second gas outlet A2.

Figure 4:
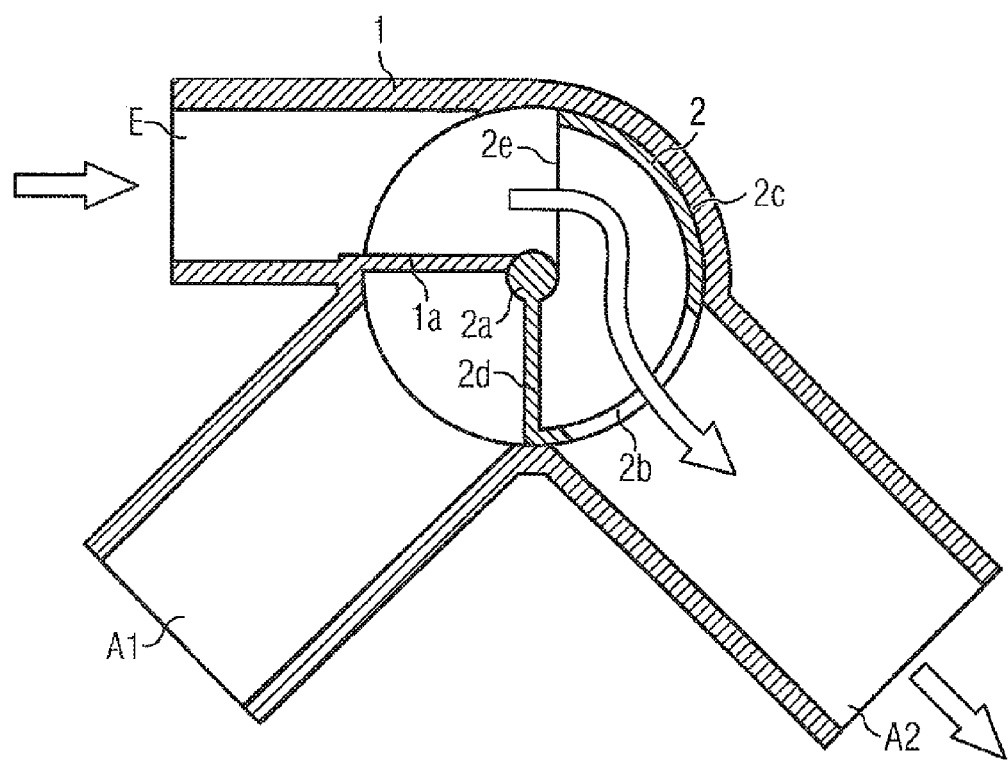
FIG. 4 is a cross section of the exhaust gas recirculation valve in a position in which it is open for a second gas outlet A2.

FIG. 4 is the exhaust gas recirculation valve for a motor vehicle in cross section in the position in which it is open for the second gas outlet A2. In comparison with the position illustrated in FIG. 3, the valve body 2 has been turned by 90° in the clockwise direction. The exhaust gas flowing into the gas inlet E in the direction of the arrow then passes via the gas passage 2e and through the penetration opening 2b of the valve body 2 into the second gas outlet A2. During this process, the partition wall 2d prevents gas passing through into the first gas outlet A1 of the exhaust gas recirculation valve. If the first gas outlet A1 for the exhaust gas is also to be opened in addition, a further rotation of the valve body 2 in the clockwise direction is required (FIG. 5).

Figure 5:
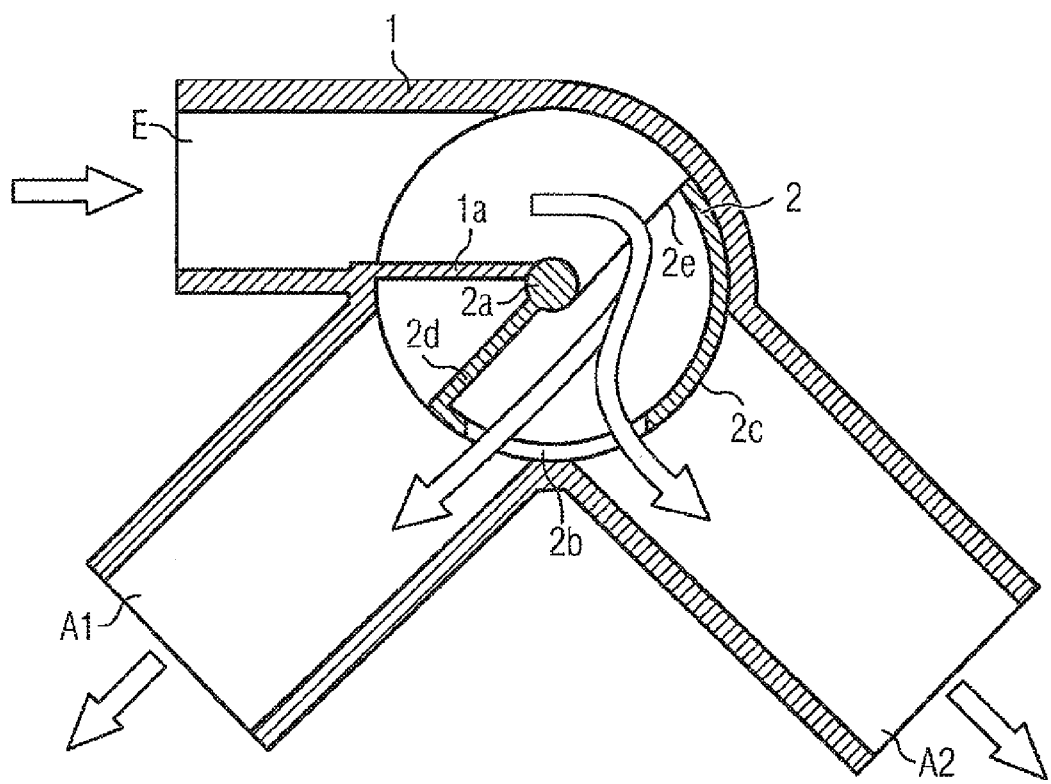
FIG. 5 is a cross section of the exhaust gas recirculation valve in a position in which it is open for the first gas outlet A1 and the second gas outlet A2.

FIG. 5 shows the exhaust gas recirculation valve for a motor vehicle in cross section in the position in which it is open for the first gas outlet A1 and the second gas outlet A2. To achieve this, starting from the position illustrated in FIG. 4, it is necessary to turn the valve body 2 arranged in the valve housing 1 by a further 45° in the clockwise direction. The exhaust gas passing through the gas inlet E into the exhaust gas recirculation valve then flows back through the gas passage 2e and the penetration opening 2b through the exhaust gas recirculation valve in the direction of the arrow. In this position the penetration opening 2b spans both the first gas outlet A1 and the second gas outlet A2 arranged proximate thereto. If the entire quantity of exhaust gas is to flow exclusively through the first gas outlet A1, a further rotation of the valve body 2 in the clockwise direction is required (FIG. 6).

Figure 6:
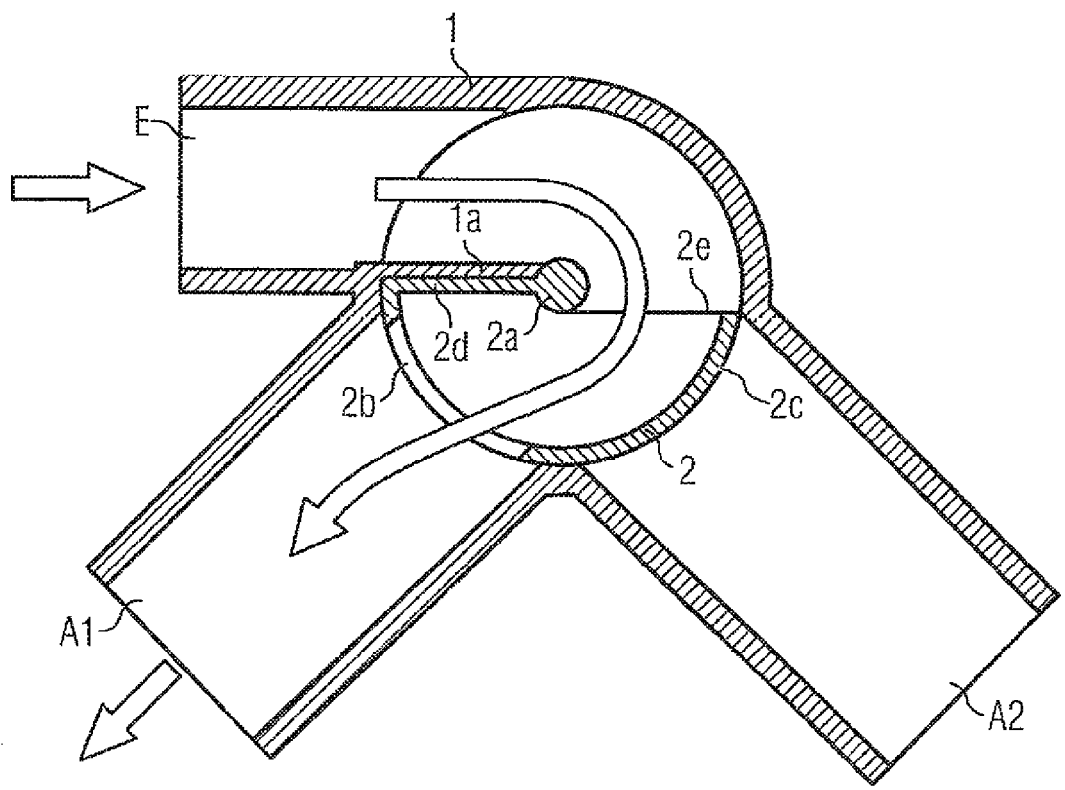
FIG. 6 is a cross section of the exhaust gas recirculation valve in a position in which it is open for the first gas outlet A1.

FIG. 6 is the exhaust gas recirculation valve for a motor vehicle in the position in which it is open exclusively for the first gas outlet A1. To achieve this, starting from the position illustrated in FIG. 5, it is necessary once again to turn the valve body 2 by a further 45° in the valve housing 1. The exhaust gas passing through the gas inlet E then flows through the gas passage 2e and the penetration opening 2b into the first gas outlet A1 in the direction of the arrow. During this process, the second gas outlet A2 is blocked since the penetration opening 2b faces only the first gas outlet A1. In this position, the partition wall 2d rests flush against the blocking wall 1a of the valve housing 1.

The exhaust gas recirculation valve is of relatively compact construction since pieces of tube, the longitudinal axes of which lie in the same plane, are provided as the gas inlet E, the first gas outlet A1 and the second gas outlet A2, the longitudinal axes of the first gas outlet A1 and of the second gas outlet A2 being at an angle of 90° to one another.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:
1. An exhaust gas recirculation valve for a motor vehicle, comprising:
   a tubular valve housing, comprising:
      a gas inlet,
      a first gas outlet, and
      a second gas outlet,
      each of the gas inlet, the first gas outlet, and the second gas outlet extending from a lateral outer surface of the tubular valve housing in proximity to one another;
   a rotatably supported valve body arranged within the tubular valve housing configured as a hollow body comprising:
      a semi-cylindrical lateral surface;
      a lateral penetration opening arranged on the semi-cylindrical lateral surface;
      a longitudinal axis of the cylinder that defines the semi-cylindrical lateral surface forming an axis of rotation of the valve body; and
      a partition wall arranged on a radius of the semi-cylindrical valve body between the axis of rotation and the semi-cylindrical lateral surface; and
      a gas passage arranged on a radius of the semi-cylindrical valve body between the axis of rotation and the semi-cylindrical lateral surface directly opposite the area without a penetration opening; and
      a blocking wall of the gas inlet which, in plan view is arranged on a side facing the first gas outlet and the second gas outlet, extending perpendicularly from a lateral inner surface of the tubular valve housing, having a height corresponding to at least the length of the valve body and configured to rest flush against the gas passage in the closed position of the exhaust gas recirculation valve.

2. The exhaust gas recirculation valve as claimed in claim 1, further comprising a shaft arranged as the axis of rotation.

3. The exhaust gas recirculation valve as claimed in claim 1, further comprising tube pieces, each tube piece having a longitudinal axis, the respective longitudinal axes of the tube pieces, lie in a same plane, the tube pieces provided as the gas inlet, the first gas outlet, and the second gas outlet.

4. The exhaust gas recirculation valve as claimed in one of claim 1, wherein the penetration opening is of circular design in side view.

5. The exhaust gas recirculation valve as claimed in one of claim 3, wherein the longitudinal axes of the first gas outlet and of the second gas outlet are at an angle of 90° to one another.

6. The exhaust gas recirculation valve as claimed in claim 2, further comprising tube pieces, each tube piece having a longitudinal axis, the respective longitudinal axes of the tube pieces, lie in a same plane, the tube pieces provided as the gas inlet, the first gas outlet, and the second gas outlet.

7. The exhaust gas recirculation valve as claimed in one of claim 3, wherein the penetration opening is of circular design in side view.

8. The exhaust gas recirculation valve as claimed in one of claim 6, wherein the longitudinal axes of the first gas outlet and of the second gas outlet are at an angle of 90° to one another.

9. The exhaust gas recirculation valve as claimed in one of claim 7, wherein the longitudinal axes of the first gas outlet and of the second gas outlet are at an angle of 90° to one another.

* * * * *